United States Patent [19]

Fukuda et al.

[11] 4,355,792
[45] Oct. 26, 1982

[54] HOLLOW MARINE FENDER

[75] Inventors: Yuji Fukuda, Yokohama; Shinichi Kajigaya, Yokosuka, both of Japan

[73] Assignee: Bridgestone Tire Company Limited, Tokyo, Japan

[21] Appl. No.: 92,312

[22] Filed: Nov. 8, 1979

[30] Foreign Application Priority Data

Nov. 13, 1978 [JP] Japan .............................. 53-139572

[51] Int. Cl.³ .............................................. F16F 1/36
[52] U.S. Cl. .................................... 267/153; 114/219; 405/215
[58] Field of Search ..................... 267/139, 140, 140.2, 267/141, 153; 114/219; 405/212, 215; 293/136

[56] References Cited

U.S. PATENT DOCUMENTS

| | | | |
|---|---|---|---|
| 3,315,951 | 4/1967 | Boschi et al. ........................ | 267/153 |
| 3,563,525 | 2/1971 | Narabu ................................ | 267/140 |
| 3,600,896 | 8/1971 | Tateisi et al. ....................... | 405/215 |
| 3,948,500 | 4/1976 | Konbuly et al. .................... | 267/140 |
| 3,999,497 | 12/1976 | Hamel ................................ | 267/140 |
| 4,258,641 | 3/1981 | Wakamiya ......................... | 114/219 |

FOREIGN PATENT DOCUMENTS

| | | | |
|---|---|---|---|
| 406856 | 8/1944 | Italy .................................... | 267/141 |
| 1074969 | 7/1967 | United Kingdom ................ | 267/153 |
| 2011579 | 7/1979 | United Kingdom ................ | 267/141 |
| 55-72506 | 5/1980 | Japan .................................. | 405/215 |

Primary Examiner—Joseph F. Peters, Jr.
Assistant Examiner—Ross Weaver
Attorney, Agent, or Firm—Sughrue, Mion, Zinn, Macpeak & Seas

[57] ABSTRACT

A hollow marine fender comprising a hollow cylindrical body formed of elastic rubber material. At least one end portion of a center surface of the hollow cylindrical body diverge toward the end thereof to form a horn-shaped portion.

3 Claims, 16 Drawing Figures

HOLLOW MARINE FENDER

BACKGROUND OF THE INVENTION

1. Field of the Invention

This invention relates to hollow marine fenders and more particularly to a hollow marine fender comprising a hollow cylindrical body formed of elastic rubber material and adapted to increase the absorption energy and improve the strength against wear and damage arising during the inclined berthing of a ship.

2. Description of the Prior Art

A hollow marine fender is generally provided at its both ends with a flange-like mounting member including a reinforcing material formed of an iron plate or the like and embedded therein. One end of the hollow marine fender is secured to a quay wall by means of an anchor bolt and the other end is provided with a shock receiving plate constituting a berthing plate.

The hollow marine fender has been installed not only in Japan but also in various other countries. But, the hollow marine fender is still inferior in absorption energy and in inclined berthing resistance property. Many attempts have been made to overcome this problem, but hitherto none has led to fully satisfactory results.

SUMMARY OF THE INVENTION

An object of the invention is to provide a hollow marine fender which can increase the absorption energy per unit weight of the elastic rubber body and which can withstand against wear and considerable damage arising during the inclined berthing of a ship.

A feature of the invention is the provision in a hollow marine fender comprising a hollow cylindrical body formed of elastic rubber material and adapted to be fitted to a quay wall for the purpose of absorbing the dynamic energy of a ship arising during the berthing thereof by enlarging the diameter of the hollow cylindrical body due to a vertical load subjected to the axial direction of the hollow cylindrical body. The improvement includes at least one end portion of a center surface of said hollow cylindrical body diverging toward the end thereof to form a horn-shaped portion.

Further objects and features of the invention will be fully understood from the following detailed description with reference to the accompanying drawings, wherein:

DETAILED DESCRIPTION OF THE PREFERRED EMBODIMENTS

Figure 1:
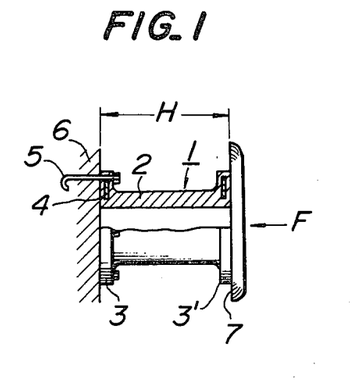
FIG. 1 is a side elevational view of a conventional hollow marine fender, partly shown in section.

FIG. 1 shows a general type of the above described conventional hollow marine fender. In FIG. 1, reference numeral 1 designates a hollow marine fender, 2 a hollow cylindrical body formed of elastic rubber material, and 3, 3' flange like mounting portions provided at the ends of the hollow cylindrial body 2 and each including a reinforcing member 4 formed of an iron plate or the like and embedded therein.

Reference numeral 5 designate an anchor bolt fitted to a quay wall 6 for the purpose of tightly securing the mounting portion 3, that is, one end of the marine fender 1 is secured to the quay wall 6, 7 shows a shock receiving plate secured, in the present example, to the mounting portion 3' and to be subjected to contact shock arising during the berthing of a ship.

Figure 2:
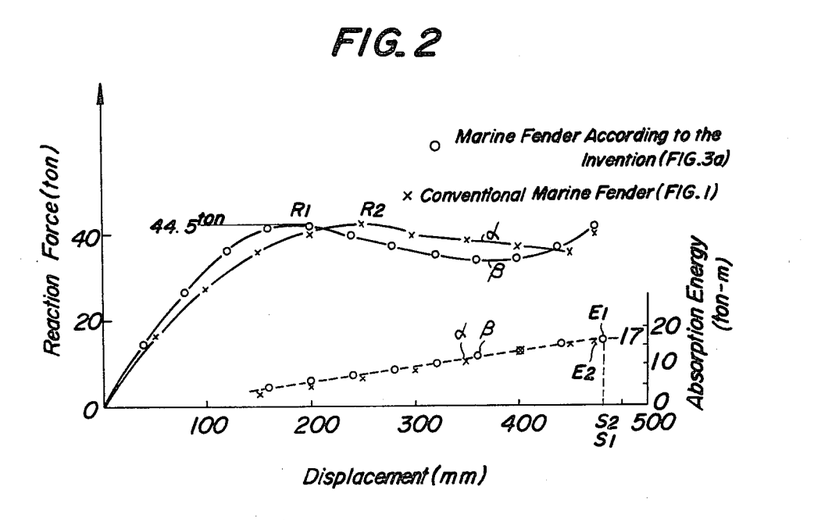
FIG. 2 is a graph showing a reaction force or absorption energy vs displacement characteristic of a hollow marine fender according to the invention compared with the conventional hollow marine fender shown in FIG. 1.

FIG. 2 shows a reaction force or absorption energy vs displacement (strain) characteristic of the conventional cylindrical marine fender shown in FIG. 1 by a curve α. As seen from the curve α, if the cylindrical marine fender becomes bent, the reaction force reaches a maximum reaction force $R_2$. If the cylindrical marine fender is further displaced, the reaction force becomes gradually decreased and then is suddenly increased to a position $S_2$ where the reaction force is substantially the same as the maximum reaction force $R_2$. Let the absorption energy up to the position $S_2$ be $E_2$ and let the amount of rubber of the marine fender 1 be $W_2$, the value $E_2/R_2W_2$ defining the performance efficiency of the marine fender is given by $E_2/R_2W_2 = 0.818$ m/ton.

The marine fender to be tested had a size of 940 mm (outer diameter) × 630 mm (inner diameter) × 1,000 mm (height). The amount of rubber $W_2$ was 467 kg, rubber hardness was 70° (Shore). The maximum reaction force $R_2$ was 44.5 ton adn the absorption energy $E_2$ was 17 ton.m.

It has generally been agreed that the above mentioned conventional marine fender 1 has an excellent characteristic. Further research and experimental tests have demonstrated that the use of the following measure according to the invention ensures a further improvement in the characteristic of the above mentioned conventional marine fender.

Figure 3A:
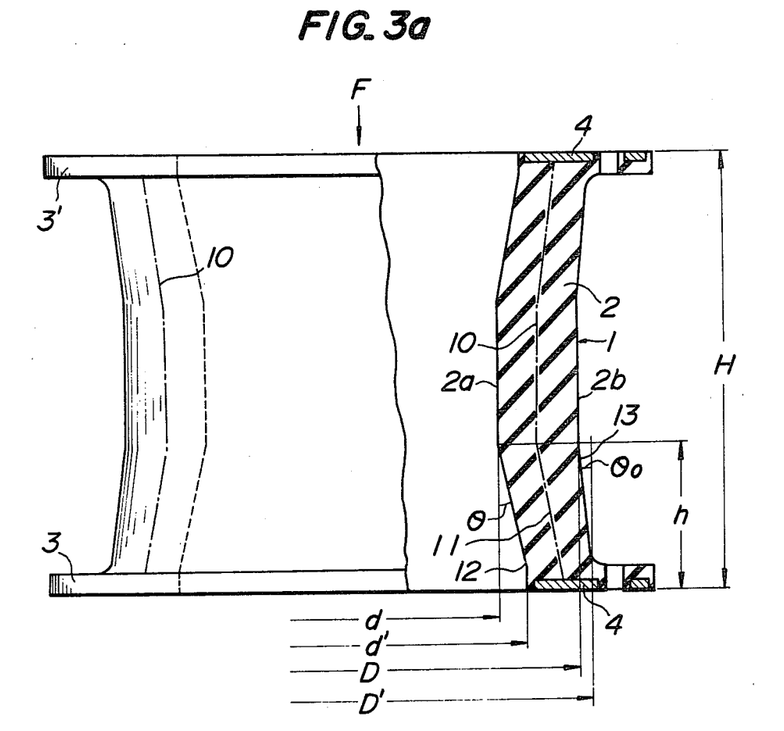
FIG. 3a is a side elevational view of one embodiment of a hollow marine fender according to the invention, partly shown in section.

FIG. 3a shows one embodiment of a hollow marine fender according to the invention. In FIG. 3a, reference numerals 1 to 4 designate like parts shown in FIG. 1. One end of the marine fender shown in FIG. 3a is fitted to the quay wall and to the other end is secured a shock receiving plate 1 (not shown) in the same manner as in the case of FIG. 1.

Figure 4:
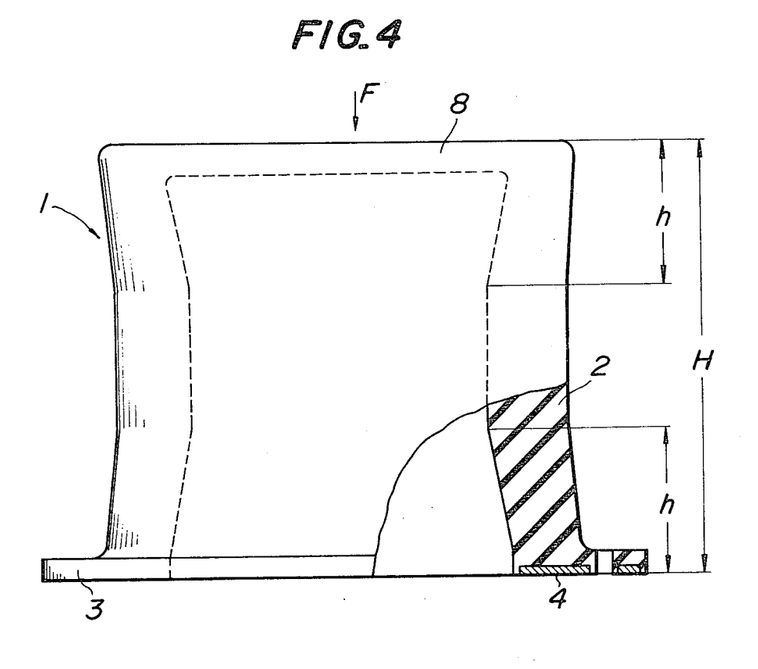
FIGS. 4 and 5 are views similar to FIG. 3a, showing another two embodiments of a hollow marine fender according to the invention.
Figure 5:
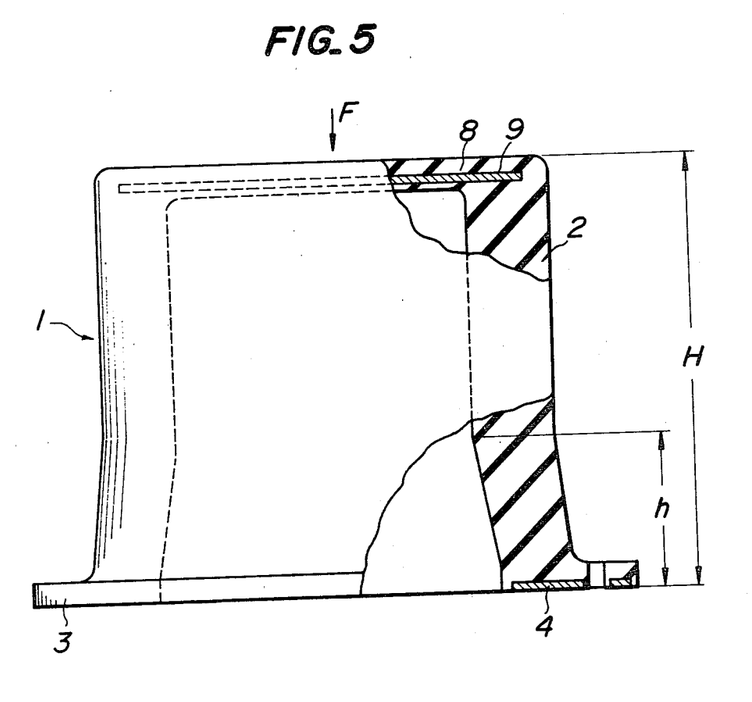

As shown in FIGS. 4 and 5, that end of the hollow cylindrical body 2 which is opposite to the end fitted to the quay wall is not provided with the mounting portion 3', but the opening of the hollow cylindrical body 2 is closed by an end wall formed of elastic rubber material and made integral with the hollow cylindrical body 2. This end wall may be used as a shock receiving portion 8 which makes contact with a ship upon its berthing. The shock receiving portion 8 may include a rigid plate 9 formed of synthetic resin or metal sheet or the like as shown in FIG. 5.

If the hollow cylindrical body 2 formed of elastic rubber material and constituting the marine fender 1 as shown in FIG. 3a according to the invention is subjected to a vertical load acting in the axial direction of the hollow cylindrical body 2 as shown by an arrow F, the hollow cylindrical body 2 bends and is deformed, bulging in its center portion in the same manner as in the case of FIG. 1.

In the present invention, the configuration of the cylinder wall of the hollow cylindrical body 2 is determined such that at least one end portion of a central surface 10 of the hollow cylindrical body 2 has an initial configuration so that the one end portion 11 is gradually diverged toward the end of the opening so as to form a horn-shaped portion. The initial configuration of the cylinder wall whose center surface becomes diverged toward the end thereof shall be understood to mean such initial configuration of the cylinder wall that at least one of the inner peripheral surface 2a and the outer peripheral surface 2b of the hollow cylinderical body 2 is diverged as shown by inclined portions 12, 13 toward the end of the hollow cylindrical body 2.

FIG. 2 also shows a reaction force or absorption energy vs displacement characteristic of the marine fender according to the invention shown in FIG. 3a by a curve $\beta$. As seen from the curve $\beta$ shown in FIG. 2, the performance efficiency $E_1/R_1W_1$ defined by the absorption energy $E_1$ of the marine fender according to the invention absorbed by it when it is displaced from a position where the maximum reaction force $R_1$ is obtained when it is bent to a position $S_1$ where the reaction force rises up again to a value which is substantially the same as the maximum reaction force $R_1$, by the maximum reaction force $R_1$ and by the amount of rubber $W_1$ of the marine fender 1 becomes 0.910 m/ton which is about 10% larger than that obtained by the conventional marine fender. That is, FIG. 2 shows the improved effect of the marine fender according to the invention if compared with that of the conventional marine fender.

The marine fender to be tested shown in FIG. 3a had a size of 940 mm (outer diameter)×630 mm (inner diameter) which is the same as that of the conventional marine fender shown in FIG. 1, but had a height of 900 mm which is lower than the conventional marine fender by 100 mm. As a result, the amount of rubber $W_1$ is decreased to 420 kg. The marine fender shown in FIG. 3a had a rubber hardness of 70° (Shore) and values of the physical properties which are the same as those of the conventional marine fender shown in FIG. 1. That is, the maximum reaction force $R_1$ is 44.5 ton and the absorption energy $E_1$ is 17 ton.m.

More particularly, the horn-shaped diverging inner and outer peripheral portions 12, 13 of the cylindrical wall have the following configuration and dimensions.

A height h of the diverging portions measured from the end surface of the marine fender is 300 mm. The maximum inner diameter d'=730 mm. The maximum outer diameter D'=1,040 mm. The inclined angle $\theta$ of the horn-shaped diverging portion 12 of the inner peripheral surface 2a is about 11°. The inclined angle $\theta_o$ of the horn-shaped diverging portion 13 of the outer peripheral surface 2b is about 5°.

The marine fender 1 constructed as above described according to the invention has an absorption energy $E_1$ which is substantially the same as $E_2$ of the conventional marine fender shown in FIG. 1. In addition, as can be seen from the above mentioned comparative data of respective heights, the invention is capable of reducing the height of the marine fender H by 10%. As a result, it is possible to maintain a desired ability for a long time.

In addition, the amount of rubber can be economized by an amount corresponding to 10% reduction of the height H and hence it is possible to make it slightly lighter in weight. As a result, a large type marine fender built is accordance with the invention is easy in mounting operation on the sea which is often dangerous. Also, it is convenient in terms of transportation.

The mode of deformation of the hollow cylindrical body 2 of the embodiment of a marine fender according to the invention shown in FIG. 3a will now be described.

Figure 3B:
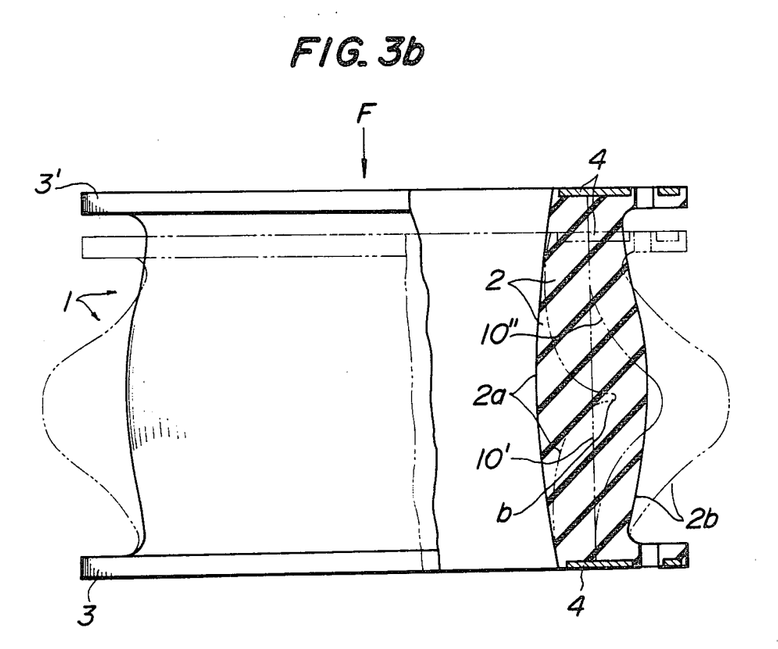
FIGS. 3b and 3c are views similar to FIG. 3a, showing successive modes of deformation arising during loading in a direction normal to the berthing face.
Figure 3C:
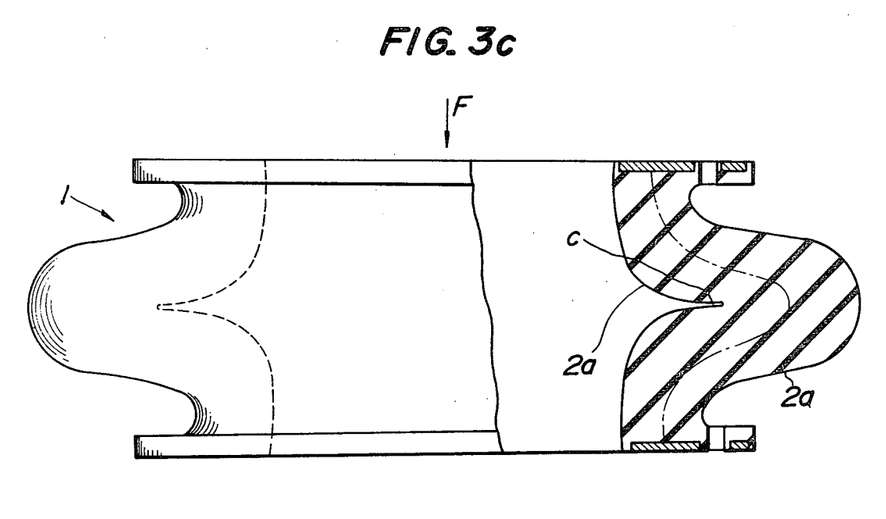

In the present embodiment, the inner and outer peripheral surfaces 2a, 2b of the cylindrical wall of the hollow cylindrical body 2 are provided at respective end portions with horn-shaped divergent portions 12, 13. As a result, the center surface 10 is hand-drum-shaped in section when the load F begins to be subjected thereto. If the hollow cylindrical body 2 is subjected to the vertical load F and compressed in its axial direction, the hollow cylindrical body 2 is deformed into a right cylinder as shown by one dot-dash lines 10' in FIG. 3b. If the hollow cylindrical body 2 is further deformed under compression, the hollow cylindrical body 2 is deformed into a beer barrel as shown by two-dots dash line 10'' in FIG. 3b. As a result, there occures a so-called bent depression b in the inner peripheral surface 2a of the cylinder wall, the upper and lower contact regions of the bent depression 6 being urged against with each other. If the load F is continuously subjected to the hollow cylindrical body 2, the upper and lower contact regions C becomes enlarged and deformed into a block-shaped body as shown in FIG. 3c, thereby suddenly increasing the reaction force and ending the deformation.

The inventors recognized that the deformation mode of the marine fender 1 increases the reaction force when the center surface 10, which is hand-drum-shaped at the beginning of application of the load, is deformed into right cylinder-shaped. The invention is based on such recognition and tends to increase the reaction force in the early stage of load, thereby increasing the absorption energy.

If the inclined angle of the end portion of the central surface 10 which is diverged toward the end of the hollow cylindrical body 2 to from a horn-shaped portion is made large, it is possible to increase the reaction force at the early stage thereof up to a given limit. However, after the central surface 10 has deformed into a right cylinder as shown by 10' in FIG. 3b, the reaction force becomes extremely decreased as a function of the displacement of the hollow cylindrical body. As a result, the absorption energy becomes decreased.

If the inclined angle of the upper and lower divergent portions of the central surface 10 is further enlarged, the center cylinder wall portion which forms a reduced diameter portion could not enlarge its diameter. On the contrary, the hollow cylindrical body 2 becomes bent in the diameter reducing direction and hence could not be used in practice.

Experimental tests on the horn-shaped portion 11 of the center surface 10 of the hollow cylindrical body have demonstrated the result that if the following two conditions are satisfied, the invention can sufficiently acheive the desired effect.

(1) Concerning the position and size of the horn-shaped portion 11 of the center surface 10 of the hollow cylindrical body 2 (refer to FIG. 3a), Within a range of
$D/d = 2.1$ to 1.4 and
$H/D = 1.5$ to 0.8,
the following conditions must be satisfied
$h/H = 0.5$ to 0.1 and $$0.4 > d' - d/d > 0.1 \text{ or}$$

$$0.4 > D' - D/D > 0.1,$$

wherein D is an outer diameter of a center portion of a hollow cylindrical body, d is an inner diameter of a center portion of a hollow cylindrical body, H is a height of a hollow cylindrical body, h is a height of a horn-shaped divergent portion, d' is an inner diameter of the end of a hollow cylindrical body and D' is an outer diameter of the end of a hollow cylindrical body.

(2) Concerning the configuration of the horn-shaped portion 11 of the center surface 10 of the hollow cylindrical body 2, Those portions of the inner and outer peripheral surfaces 2a, 2b of the cylindrical wall which correspond to the horn-shaped portion 11 of the center surface 10 are diverged outwardly with some more or less curvature permitted.

In this case, if the horn-shaped portion 12 of the inner peripheral surface 2a is made convex facing inwardly with respect to the hollow cylindrical body 2, the amount of rubber becomes somewhat increased, but the inclined berthing of a ship in directions other than normal to the berthing face becomes stable. On the contrary, if the horn-shaped portion 12 of the inner peripheral surface 2a is made concave facing inwardly with respect to the hollow cylindrical body 2, the amount of rubber becomes decreased and the hollow cylindrical body 2 becomes lighter in weight, thereby preventing the front end of the hollow cylindrical body 2 from hanging downwardly.

The horn-shaped portion 12 of the inner peripheral surface 2a may be made convex-concave or vice versa. But, such deformation is difficult in manufacture and the stability of the hollow cylindrical body 2 during the inclined berthing of a ship in directions other than normal to the berthing face becomes inferior.

The horn-shaped portion 13 of the outer peripheral surface 2b may also diverge outwardly with substantially the same result as in the case of the horn-shaped portion 12 exhibited.

As can be seen from the above, if the above mentioned conditions (1) and (2) are satisfied, the desired bending deformation in the diameter enlarging direction is attained with the reaction force effectively increased.

Figure 6:
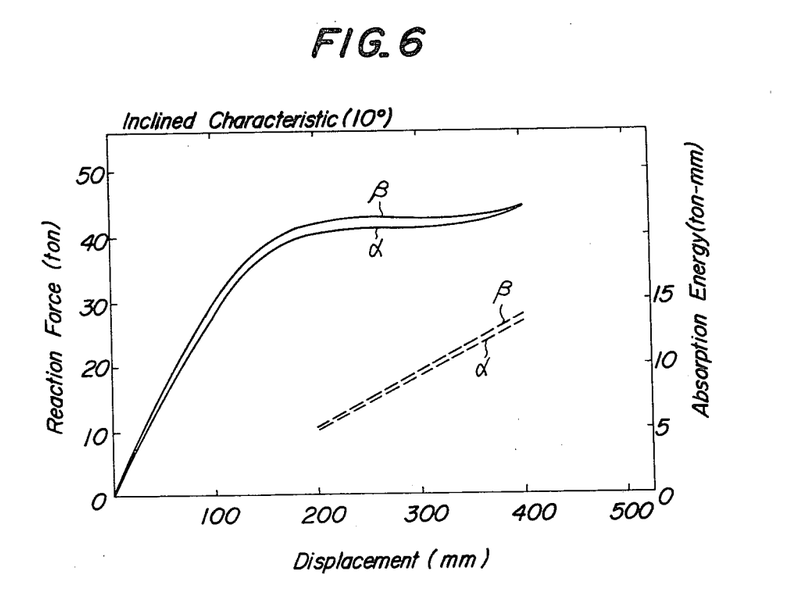
FIG. 6 is a graph showing a reaction force or absorption energy vs displacement characteristic of a hollow marine fender according to the invention compared with the conventional hollow marine fender shown in FIG. 1 in the case of the inclined berthing of a ship.

FIG. 6 shows experimental test's result on the resistant effect of a conventional marine fender and a marine fender according to the invention during the inclined berthing of a ship. In the experimental tests, use was made of those marine fenders from which were plotted the characteristic curves $\alpha$, $\beta$ shown in FIG. 2. In this inclined berthing resistant test, the hollow cylindrical body 2 was compressed in a direction which is inclined at a berthing angle of 10° with respect to the axis of the marine fender. This type of inclined berthing of the ship frequently occurs.

As seen from FIG. 6, the absorption energy $\alpha$ of the conventional marine fender is reduced from that shown in FIG. 2 by about 11%, while the absorption energy $\beta$ of the marine fender according to the invention is reduced from that shown in FIG. 2 by only about 8%. As a result, a ratio of the reduced absorption energies 8:11 is only 1/1.375. Thus, the marine fender according to the invention is capable of berthing a ship in a safe manner even when the inclined berthing of the ship is practically effected.

The marine fender is subjected to a shearing load when a ship is berthed while moving in parallel to a quay wall.

Figure 7:
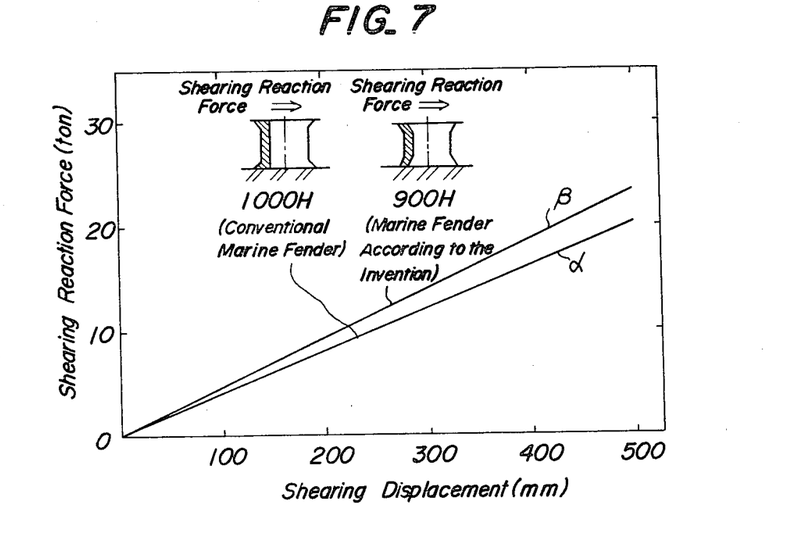
FIG. 7 is a graph showing a shearing reaction force vs shearing displacement characteristic of a hollow marine fender according to the invention compared with the conventional marine fender shown in FIG. 1 in the case of the shearing berthing of a ship.

FIG. 7 shows that a marine fender according to the invention is also excellent in shearing resistant characteristic. In FIG. 7, a shearing reaction force vs shearing displacement characteristic of the marine fender according to the invention is shown by a curve $\beta$, while the corresponding characteristic of the conventional marine fender is shown by a curve $\alpha$.

The inventors have found out that the above mentioned significant improvement in the inclined berthing characteristic and shearing berthing characteristic is due to the use of diverging the horn-shaped portion 11 of the center surface 10 of the hollow cylindrical body 2 toward the end thereof.

Figure 8A:
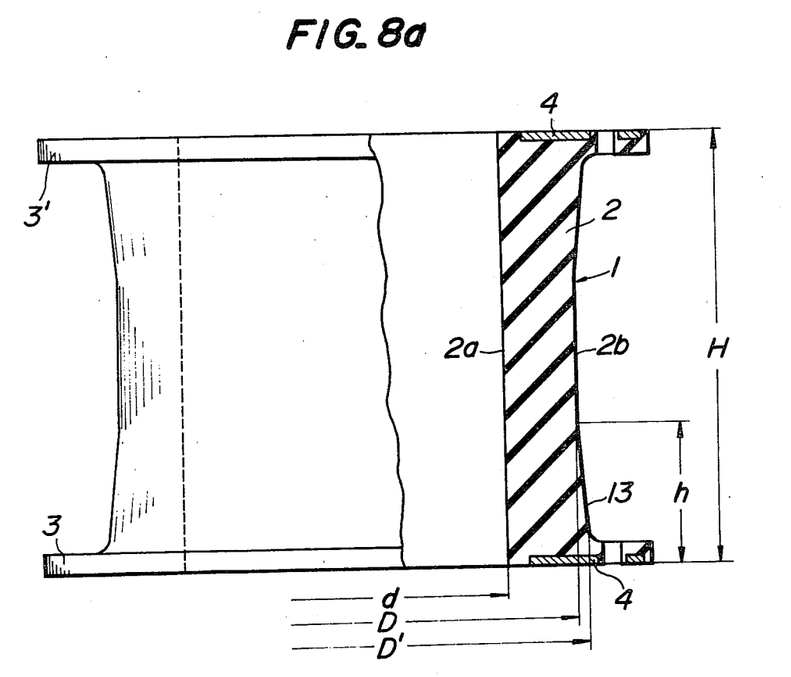
FIGS. 8a, 8b, 9, 10, 11 and 12 are side elevational views of further embodiments of a hollow marine fender according to the invention, partly shown in section.

FIG. 8a shows another embodiment of a marine fender according to the invention in which the inner peripheral surface 2a is made straight, while a horn-shaped portion 13 of the outer peripheral surface 2b diverges toward the end of the hollow cylindrical body 2.

Figure 8B:
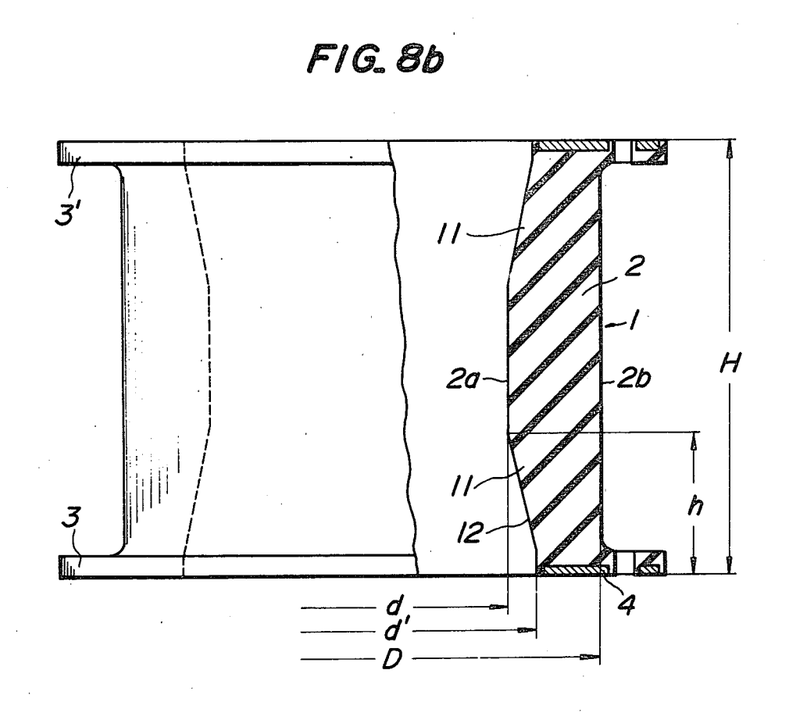

FIG. 8b shows a further embodiment of a marine fender according to the invention in which the upper and lower portions of the inner peripheral surface 2a diverge toward the ends of the hollow cylindrical body 2 to form upper and lower horn-shaped portions while the outer peripheral surface 2b is straight.

Figure 9:
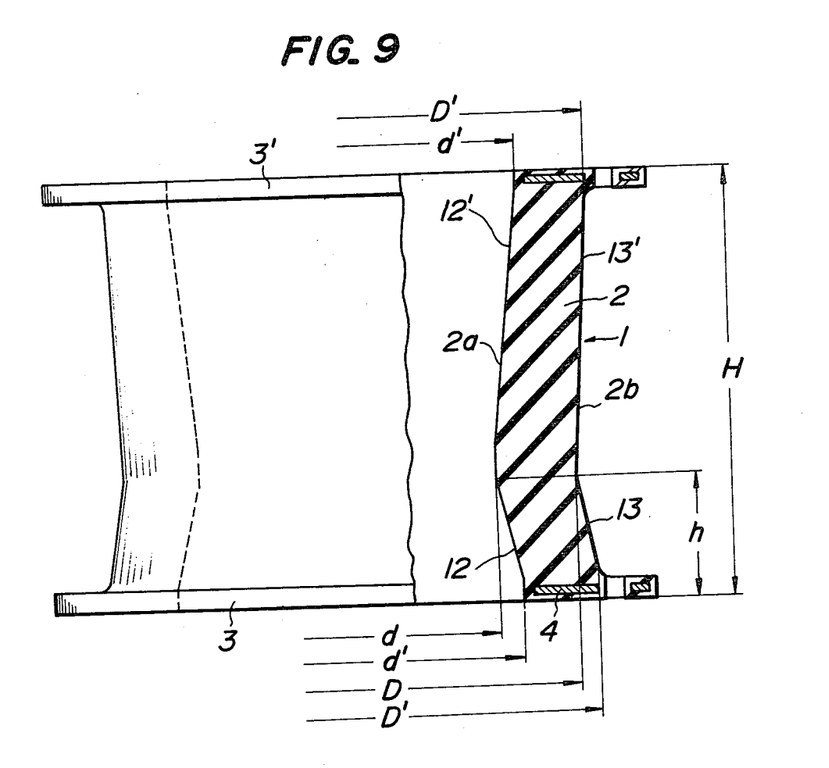

FIG. 9 shows a still further embodiment of a marine fender according to the invention in which the horn-shaped portions 12, 12' and 13, 13' of the inner and outer peripheral surfaces 2a, 2b of the hollow cylindrical body 2 are made unsymmetrical with respect to the transverse center line of the hollow cylindrical body 2. Experimental tests have shown that the effect of the present embodiment is substantially the same as that of the previous embodiments.

Figure 10:
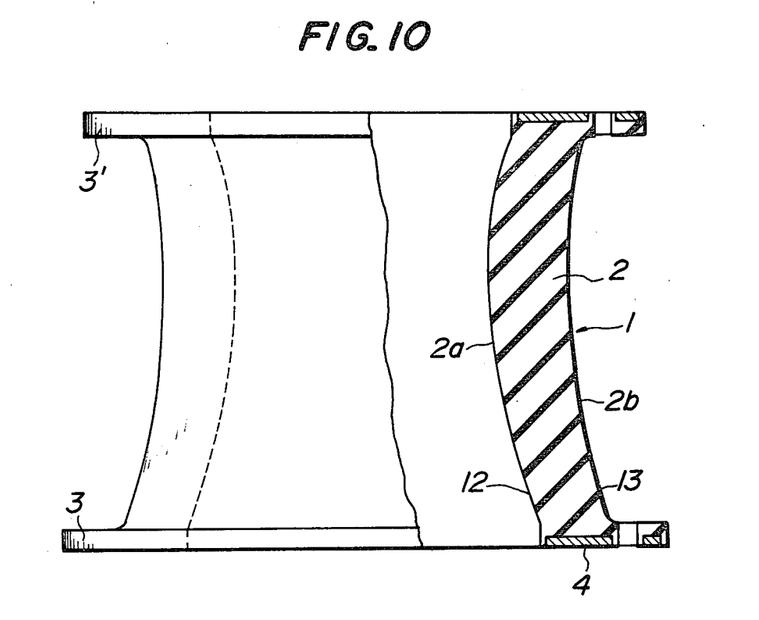

FIG. 10 shows another embodiment of a marine fender according to the invention in which the inner and outer peripheral surfaces 2a, 2b are made convex facing inwardly and the inner and outer diameter s of the lower end of the hollow cylindrical body 2 are made larger than those of the upper end thereof.

Figure 11:
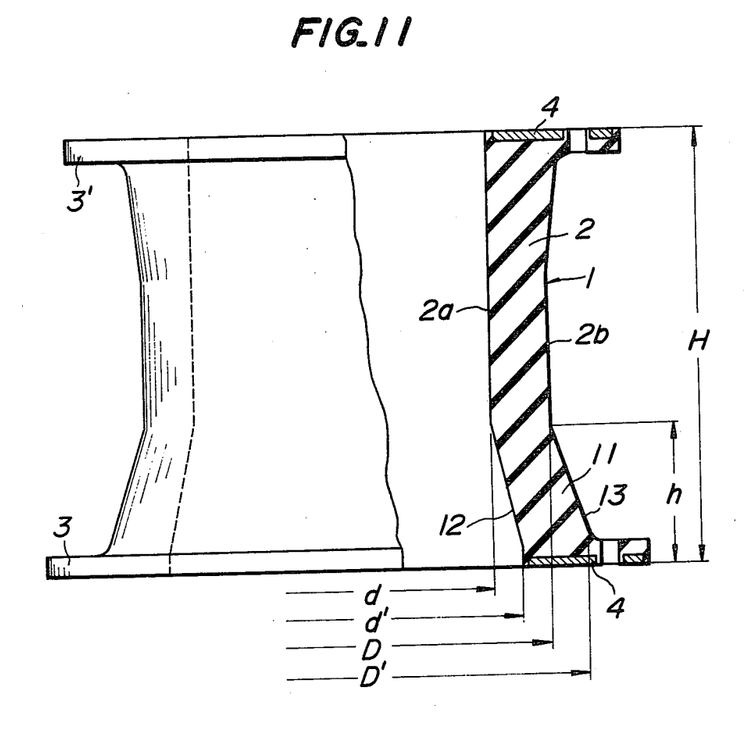

FIG. 11 shows a further embodiment of a marine fender according to the invention in which the lower portions 12, 13 of the inner and outer peripheral surfaces 2a, 2b, of the hollow cylindrical body 2 diverge toward the end to form horn-shaped portions, respectively, while the upper portion of the outer peripheral surface 2b of the hollow cylindrical body 2 diverges only toward the end, the outer portion of the inner peripheral portion 2a and the center portion of the outer peripheral portion 2b remaining straight. The inner and outer diameters of the lower end of the hollow cylindrical body 2 are made larger than those of the upper end thereof. Experimental tests have demonstrated that the embodiments shown in FIGS. 10 and 11 are also sufficiently effective.

Figure 12:
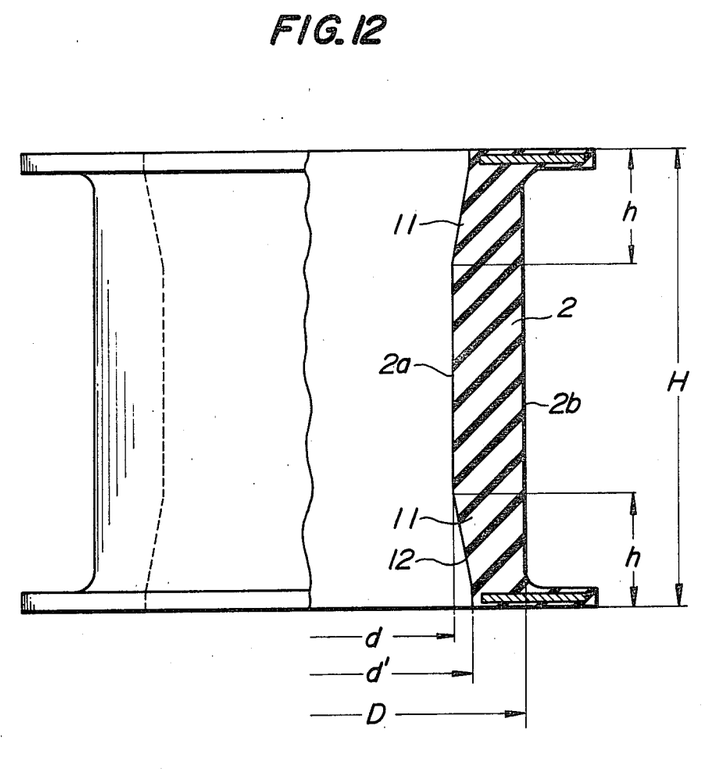

FIG. 12 shows a still further embodiment of a marine fender according to the invention in which the upper and lower portions 11, 11 of the inner peripheral surface 2a diverge toward the ends of the hollow cylindrical body 2 to form upper and lower horn-shaped portions while the outer peripheral surface 2b is made straight. The present embodiment is similar to the embodiment shown in FIG. 8b, but has that portion of the inner peripheral surface 2a which is located between the upper and lower horn-shaped portions 11, 11 and which is longer than that shown in FIG. 8b. The marine fender shown in FIG. 12 has a height H of 1,000 mm, an outer diameter D of 940 mm, an inner diameter d of 630 mm, a length h of a horn-shaped divergent portion of 300 mm and an inner diameter d' of the end of a hollow cylindrical body of 705 mm.

Figure 13:
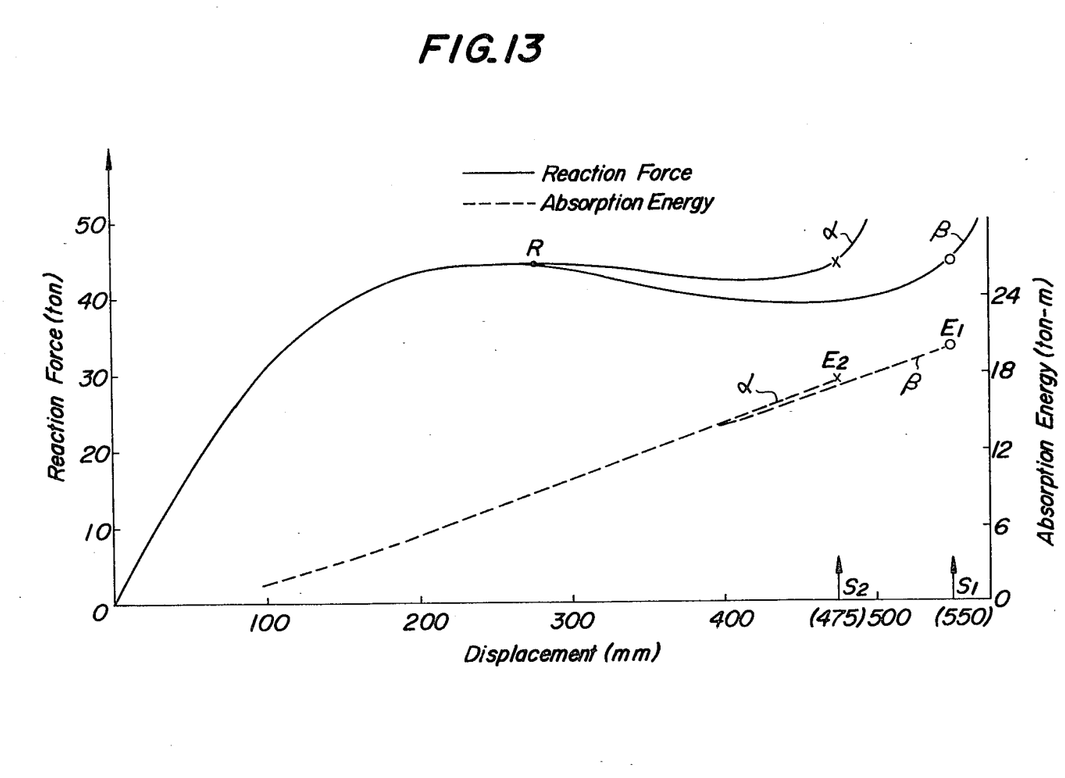
FIG. 13 is a graph showing a reaction force or absorption energy vs displacement characteristic of an embodiment shown in FIG. 12 compared with a conventional marine fender whose height is the same as that of the embodiment shown in FIG. 12.

FIG. 13 shows a reaction force or absorption energy vs displacement (strain) characteristic of a conventional cylindrical marine fender having a height H of 1,000 mm by a curve $\alpha$ and that of the embodiment shown in FIG. 12 by a curve $\beta$. As seen from the curves $\alpha$ and $\beta$, the performance efficiency of $E_1/RW$ defined by the absorption energy $E_1$ of the marine fender of the present embodiment absorbed by it when it is displaced from a position where the maximum reaction force R is obtained when it is bent to a position $S_1$ where the reaction force rises up to a value which is substantially the same as the maximum reaction force R, by the maximum reaction force R and by the amount of rubber W of the marine fender becomes about 15% larger than $E_2/RW$ obtained by the conventional marine fender. Such improvement of the performance efficiency is due to increase of the absorption energy from $E_2$ to $E_1$ when the maximum reaction force R is the same in both marine fenders.

As stated hereinbefore, the marine fender according to the invention has a number of advantages. In the first place, it is possible to improve the absorption energy. Secondly, the marine fender has an excellent performance efficiency E/RW. Third, the marine fender has also an excellent inclined berthing resistant characteristic and shearing berthing resistant characteristic. Fourth, it is possible to prevent the hollow cylindrical body from being hanging down. Fifth, the marine fender maintains its characteristics for a long time. Finally, it is possible to maintain the initial characteristic for a long time.

What is claimed is:

1. In a hollow marine fender comprising a hollow cylindrical body formed of elastic rubber material and adapted to be fitted to a quay wall for the purpose of absorbing the dynamic energy of a ship arising during the berthing thereof by enlarging the diameter of the hollow cylindrical body due to a vertical load subjected to the axial direction of the hollow cylindrical body, at least one end provided with a flange-like mounting portion containing a reinforcing member embedded therein, for mounting said fender to a quay wall the improvement comprising; a portion of a center surface of said hollow cylindrical body which is located at the center part of said hollow cylinder body in its axial direction is made the minimum internal diameter said center surface portion having the minimum internal diameter is deformed into a barrel-like bulging shape by enlargement of the diameter due to a berthing load, and having inner surfaces extending from said center surface portion to each end of the fender, said inner surfaces diverging from said portion of minimum internal diameter toward the end of the fender to form a horn-shaped portion.

2. The hollow marine fender according to claim 1, wherein said hollow cylindrical body comprises an outer peripheral surface diverging toward the end thereof so as to form a horn-shaped portion.

3. In a hollow marine fender comprising a hollow cylindrical body formed of elastic rubber material and adapted to be fitted to a quay wall for the purpose of absorbing the dynamic energy of a ship arising during the berthing thereof by enlarging the diameter of the hollow cylindrical body due to a vertical load subjected to the axial direction of the hollow cylindrical body, at least one end provided with a flange-like mounting portion containing a reinforcing member embedded therein, for mounting said fender to a quay wall the improvement comprising; a portion of a center surface of said hollow cylindrical body which is located at the center part of said hollow cylinder body in its axial direction is made the minimum internal diameter and said center surface portion having the minimum internal diameter is deformed into a barrel-like bulging shape by enlargement of the diameter due to a berthing load and wherein within a range of $D/d = 2.1$ to 1.4 and $H/D = 1.5$ to 0.8, the following conditions are satisfied $h/H = 0.5$ to 0.1 and $0.4 > d' - d/d > 0.1$ or $0.4 > D' - D/D > 0.1$, where D is an outer diameter of a center portion of a hollow cylindrical body, d is said minimum internal diameter of a center portion of a hollow cylindrical body, H is a height of a hollow cylindrical body, h is a height of an inner surface diverging from said portion of minimum diameter to a maximum diameter which extends to the end of the fender to form a horn-shaped divergent portion, d' is an inner diameter of the end of a hollow cylindrical body and D' is an outer diameter of the end of a hollow cylindrical body.

* * * * *